3,519,657
PRODUCTION OF ACIDS FROM AMIDES
George A. Olah, Wellesley, Mass., assignor to The Dow Chemical Company, Midland, Mich., a corporation of Delaware
No Drawing. Filed Apr. 5, 1965, Ser. No. 445,790
Int. Cl. C07c 53/22, 63/26, 143/02
U.S. Cl. 260—389
6 Claims

ABSTRACT OF THE DISCLOSURE

Organic carboxamides and sulfonamides are converted to the corresponding acids by reacting these amides at moderate temperature with a stable ionizable nitrosonium salt such as $NOBF_4$ in an organic medium. The acid products are useful principally as chemical intermediates, for example, for making soaps and detergents.

This invention relates to a new method for converting organic carboxamides, and sulfonamides to the corresponding carboxylic and sulfonic acids.

In some cases, fairly efficient acid hydrolysis of amides has been accomplished with nitrous acid in strong sulfuric acid solution. Conventionally, the acid hydrolysis of amides requires large amounts of strong acid and prolonged heating at elevated temperatures. Even under such drastic conditions, the yield of the corresponding acid is often poor.

It has now been found that organic carboxamides, sulfonamides, and their N-monosubstituted derivatives are smoothly and conveniently transformed into the corresponding carboxylic and sulfonic acids at moderate temperatures using stable and easily handled reagents in about a theoretical proportion by reacting such amides with a stable ionizable nitrosonium salt. This reaction is operable within a wide range of temperatures, for example, from $-100°$ C. to $200°$ C., and in most cases good yields are obtained. A reaction temperature of $-20°$ C. to $50°$ C. is generally sufficient. The reaction takes place with the liberation of nitrogen. Using $NOBF_4$ as an illustrative nitrosonium salt, the equations for the specific reactions are as follows:

$$RCONH_2 + NOBF_4 \rightarrow RCO_2H + N_2 + HBF_4$$

$$RSO_2NH_2 + NOBF_4 \rightarrow RSO_3H + N_2 + HBF_4$$

Amides to which this process is applicable are primary and secondary amides of stable organic carboxylic and sulfonic acids. These amides are represented by the general formulas:

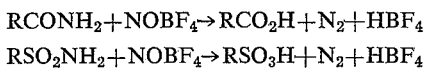

where R is an organic radical with a valence of $n$, R' is hydrogen or an organic radical, and $n$ is an integer from one to about four.

Amides to which the process is usually and most advantageously applied are those of the above formula where R' is hydrogen or alkyl of 1–4 carbon atoms and R is a radical of 1–30 carbon atoms with valence as shown. Typically, R is a member of the group consisting of aliphatic, alicyclic, and aromatic hydrocarbon radicals, such radicals optionally having one or more halogen, nitro, alkyl, alkoxy, aryl or aryloxy substituents, wherein aryl is phenyl, alkylphenyl, halophenyl, or nitrophenyl. Where R is a relatively hindered group such as tertiary alkyl, ortho-substituted phenyl and the like, the reaction is usually slower, often requiring higher temperatures, and in some cases may be incomplete. When R is phenyl having a teritary alkyl substituent ortho to an amide group, that group is usually not completely reacted in the process and an added oxidation step may be required to obtain the acid as the major product.

Any stable ionizable inorganic nitrosonium salt is operable in the process. Such salts include $NOBF_4$, $NOHSO_4$, $NOCl_4$, $NOPF_6$, $NOSbF_6$, $NOAsF_6$, $(NO)_2SiF_6$ and other like salts which in solution provide the nitrosonium ion. Nitrosonium fluoroborate, $NOBF_4$ is preferred for convenience of preparation and handling. The salt can be used in any proportion relative to the amide, since the two will ordinarily react in the ratio of one nitrosonium radical to one amide group until one of the other is exhausted. Preferably, one molar equivalent of nitrosonium salt or a small excess thereof is employed per equivalent of amide.

Although a solvent is not essential, the reaction is facilitated when carried out in inert solvent solution or dispersion. Solvents such as acetonitrile, carbon tetrachloride, benzene, hexane, ether, sulfolane, nitromethane and similar solvents which are unreactive in the process are suitable.

The process can be carried out by any conventional procedure for reacting materials in a liquid reaction mixture. Good results are obtained when a solution of the nitrosonium salt in an inert solvent is added to a similar solution of about a mole equivalent of the amide at about 0–20° C. at about the rate at which the salt is reacted as evidenced by the evolution of nitrogen. It is often preferable to warm up the reaction mixture after all of the nitrosonium salt has been added so as to obtain as nearly complete reaction as possible. The acid product can be recovered from the reaction mixture by usual means such as distillation or recrystallization, depending upon the properties of the particular acid. Where the reaction mixture is to be heated as in distillation, a small amount of water may first be added to destroy any unreacted nitrosonium salt and thereby avoid possible side reactions.

EXAMPLE 1

A solution of 0.1 g. mole of benzamide in 100 ml. of acetonitrile was prepared in a reaction flask. With the flask immersed in an ice bath, 0.1 g. mole of nitrosonium fluoroborate ($NOBF_4$) in 100 ml. of acetonitrile was added to the cold solution with stirring. After nitrogen evolution subsided, the reaction mixture was warmed briefly to 50° C. to complete the reaction. The mixture was cooled to room temperature and stirred with 5 ml. of water to destroy any small amount of remaining nitrosonium fluoroborate. The reaction mixture was then dried, excess solvent was distilled off, and the benzoic acid product was crystallized from the remaining solution. A yield of 0.093 g. mole of benzoic acid was obtained.

EXAMPLE 2

According to the procedure of Example 1, N-isopropylisovaleramide was reacted with an equal molar amount of nitrosonium fluoroborate in acetonitrile solution. Distillation of the reaction mixture yielded 73 percent of the theoretical quantity of isovaleric acid.

A number of other carboxamides were reacted with an equal molar amount or a slight excess of a nitrosonium salt in inert solvent solution according to the general procedure described in the above examples. Nitrosonium salts employed were nitrosonium fluoroborate and nitrosonium hydrogen sulfate while inert solvents such as acetonitrile, nitromethane and sulfolane were used in these reactions. The following table lists these amides, the acid products obtained, and the yields of acids based on the starting amide.

EXAMPLES 3-15

| Amide | Acid | Percent yield |
|---|---|---|
| Trifluoroacetamide | Trifluoroacetic | 83 |
| Pivalamide | Pivalic | 79 |
| 2,2-diisopropylacetamide | 2,2-diisopropylacetic | 69 |
| 4-methylvaleramide | 4-methylvaleric | 80 |
| N,2-Diisopropyl-3,3-dimethylbutyramide | 2-isopropyl-3,3-dimethylbutyric | 63 |
| Triphenylacetamide | Triphenylacetic | 21 |
| 2,2-dipropylvaleramide | 2,2-dipropylvaleric | 61 |
| 2,2-diisopropyl-3-methylbutyramide | 2,2-diisopropyl-3-methylbutyric | 50 |
| p-Toluamide | p-Toluic | 95 |
| o-Toluamide | o-Toluic | 81 |
| m-Tert-butylbenzamide | m-Tert-butylbenzoic | 89 |
| 2,4,6-triisopropylbenzamide | 2,4,6-triisopropylbenzoic | 70 |
| 2,4,6-trimethylbenzamide | 2,4,6-trimethylbenzoic | 78 |

EXAMPLES 16-18

Several sulfonamides were converted to the corresponding sulfonic acids by adding a slurry of 0.1 g. mole of $NOBF_4$ in 60 ml. of acetonitrile to a stirred solution of 0.1 g. mole of the sulfonamide in 50 ml. of the same solvent at ice bath temperature. The reaction mixture was stirred until a homogeneous solution was formed and nitrogen evolution had substantially ceased. The solution was then heated briefly to 50° C. to complete the reaction. The solvent was distilled off under vacuum and the residual sulfonic acid product was purified by recrystallization. Some representative results are listed below with yields calculated on the basis of the amount of amide employed.

| Amide | Acid | Percent yield |
|---|---|---|
| Benzenesulfonamide | Benzenesulfonic | 82 |
| p-Toluenesulfonamide | p-Toluenesulfonic | 87 |
| 2,4,6-trimethyl-benzenesulfonamide | 2,4,6-trimethylbenzenesulfonic | 76 |

By the general procedure illustrated above, other carboxamides and sulfonamides are similarly converted to the corresponding acids. For example, nitrosonium fluoroborate is reacted with malonamide to produce malonic acid, nitrosonium perchlorate is reacted with terephthalamide to make terephthalic acid, acrylamide is similarly converted to acrylic acid, N-butylstearamide is reacted to make stearic acid, chlorophenoxyacetamide is reacted in the process to make chlorophenoxyacetic acid, cyclohexanecarboxamide is converted to cyclohexanecarboxylic acid, and cyclopentenecarboxamide is reacted to make cyclopentenecarboxylic acid.

Similarly, nitrosonium hexafluorophosphate and naphthalenesulfonamide are reacted to make naphthalenesulfonic acid, nitrosonium bisulfate and ethanesulfonamide are reacted to make ethanesulfonic acid, and N-methyl cyclohexanesulfonamide is reacted in this process to make cyclohexanesulfonic acid.

In the same way, acids such as phenylacetic acid, methoxyphenylacetic acid, adipic acid, undecylenic acid, nitrobenzoic acid, naphthoic acid, trimesic acid, and naphthaleneacetic acid are obtained by reacting the corresponding carboxamide with a nitrosonium salt as described above. Sulfonic acids such as 1,2-butanedisulfonic acid, naphthalenedisulfonic acid, chlorobenzenesulfonic acid, and decanesulfonic acid are similarly prepared from the corresponding sulfonamides.

I claim:

1. In a process for converting to the corresponding acid an amide selected from the group consisting of the primary and secondary amides of stable organic carboxylic and sulfonic acids, the improvement of reacting by contacting said amide with a stable ionizable inorganic nitrosonium salt at −100° C. to 200° C. in an inert organic solvent medium.

2. The process of claim 1 wherein the amide has one of the formulas (A)
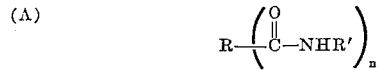

and (B)
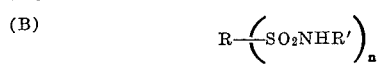

where R is a radical of 1–30 carbon atoms with a valence of $n$ and is selected from the group consisting of aliphatic, alicyclic, and aromatic hydrocarbon radicals and substituted derivatives thereof wherein the substituents are halo, nitro, alkyl, alkoxy, phenyl, alkylphenyl, halophenyl and nitrophenyl radicals, R' is selected from the group consisting of hydrogen and an alkyl radical of 1–4 carbon atoms, and $n$ is an integer from one to four.

3. The process of claim 2 wherein the amide has Formula A.

4. The process of claim 3 wherein the nitrosonium salt is $NOBF_4$.

5. The process of claim 2 wherein the amide has Formula B.

6. The process of claim 5 wherein the nitrosonium salt is $NOBF_4$.

References Cited

Gatterman, Berichte deut. Chem., vol. 32, pp. 1116–1121 (p. 1118 relied upon) (1899).

Houben-Weyl, Methoden der Organischen Chemie, vol. 9, p. 531 (4th ed. 1955).

Masek et al., Chemical Abstracts, vol. 58, column 13450(e) (1963). [abstract of Coll. Czech. Chem. Comm., vol. 28, pp. 670–687 (1963)]

Olah, Chem. Ber., vol. 89, pp. 2374–2377 (1956).

LORRAINE A. WEINBERGER, Primary Examiner

E. J. SKELLY, Assistant Examiner

U.S. Cl. X.R.

260—400, 413, 503, 505, 512, 513, 514, 515, 520, 521, 526, 535, 537, 539, 540, 541